Dec. 6, 1955 A. HERMANN 2,726,072
DEVICE FOR ABSORBING GASES BY LIQUIDS, ESPECIALLY
FOR USE IN CONNECTION WITH THE PRODUCTION
OF HYDROCHLORIC ACID
Filed May 29, 1951
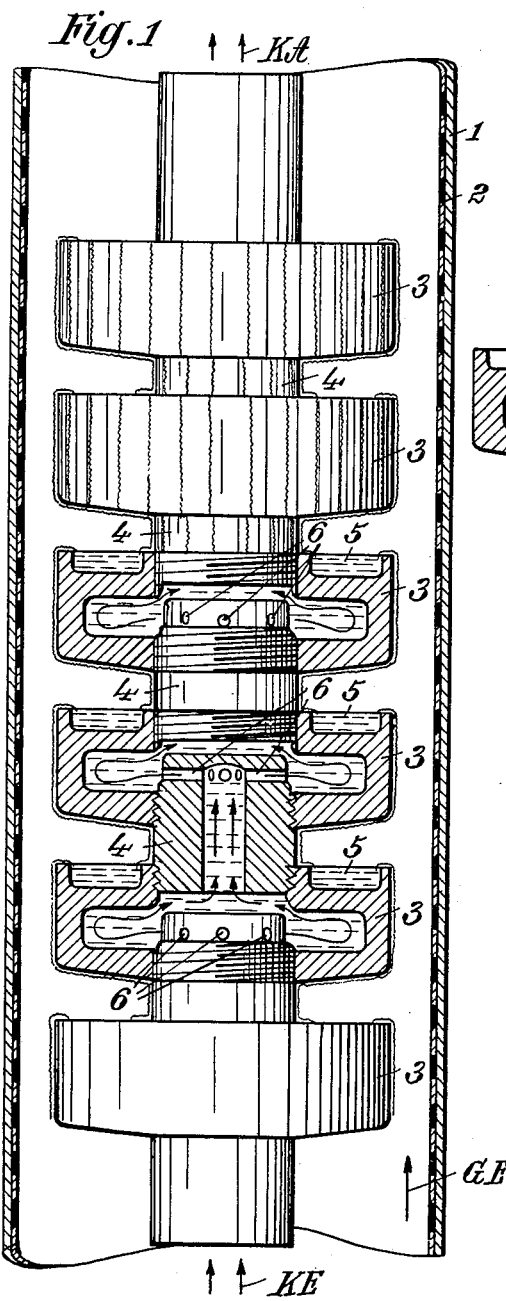
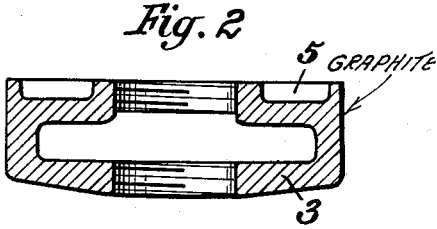
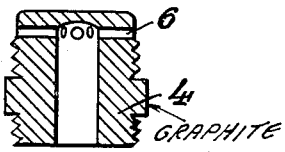
Inventor:
Albert Hermann
by Toulmin + Toulmin
Attorneys

United States Patent Office 2,726,072
Patented Dec. 6, 1955

2,726,072

DEVICE FOR ABSORBING GASES BY LIQUIDS, ESPECIALLY FOR USE IN CONNECTION WITH THE PRODUCTION OF HYDROCHLORIC ACID

Albert Hermann, Rheinfelden (Baden), Germany, assignor, by mesne assignments, to Dynamit-Actien-Gesellschaft vormals Alfred Nobel & Co., Troisdorf, Germany Application May 29, 1951, Serial No. 228,822
In Germany December 23, 1948

Public Law 619, August 23, 1954
Patent expires December 23, 1968

3 Claims. (Cl. 261—11)

In chemical processes carried out on a large scale, particularly in connection with the production of hydrochloric acid, it frequently becomes necessary in the continuous processes to cause gases to be absorbed by or dissolved in liquids. Inasmuch as this step frees a considerable amount of heat energy, two problems have to be met, i. e.

a. To create a large surface of liquid, and
b. To carry away the heat of reaction.

If liquids or gases are involved which have a strong corroding or etching effect, a third problem arises, i. e., c. As to the material from which the absorption container is to be made.

The solution of this problem encounters certain difficulties with regard to the discharge of heat.

It is, therefore, an object of this invention to provide a device for absorbing gases by liquids which will solve the above-mentioned problems.

It is another object of this invention to provide a device for absorbing gases by liquids which will distribute the liquid evenly and prevent the absorbing liquid from contracting to individual liquid strings or threads.

It is still another object of this invention to provide a device of the type set forth above, which is in the form of a column made of a material having both a high heat resistance and great corrosion resistance.

These and other objects and advantages of the invention will appear more clearly from the following specifications in connection with the accompanying drawing in which:

Figure 1 illustrates an embodiment of the device according to the present invention.

Figure 2 shows a section through an individual hollow body a plurality of which forms the column of the present invention.

Figure 3 is a vertical section through a connecting nipple forming part of the column according to the present invention.

The present application is a sole application as distinguished from the co-pending application, Serial No. 228,821, filed May 21, 1951, which is a joint application with applicant being one of the joint inventors.

GENERAL ARRANGEMENT

The gas absorption device according to the present invention comprises a column in which the size of the cross-section varies alternately along the length of the column, the interior of said column being passed through by cooling means, while the absorbing liquid in a thin layer flows down on the outside of the column, thereby offering to the gas to be absorbed a large moving surface. The column is built up by a plurality of coaxially arranged superimposed dish-shaped hollow bodies which are surrounded by a vertically arranged tube or pipe. Due to the greatly varying size of the cross-section of the column as referred to above, an even distribution of the liquid is assured, and a contraction of the absorbing liquid along the column to individual liquid strings or threads is avoided.

It is particularly advantageous to provide in the upper end of the individual dish-shaped hollow bodies one or more grooves in which the absorption liquid will collect in order subsequently to flow down on the sides of the body.

The individual dish-shaped hollow bodies are preferably connected with each other by means of nipples which are provided with a bore arranged in the direction of the longitudinal axes of the nipples so that the cooling means can pass through the entire column. In order to obtain a thorough whirling action of the cooling means and thereby an intensive cooling of the inner surface of the column, the nipples are preferably provided with lateral apertures through which the cooling means may pass in radial direction into the hollow bodies.

In order that the cooling effect may also benefit the liquid flowing down on the outside of the column, it is necessary that the column consist of material of good heat conductivity. In this connection the third problem mentioned above under "c" and concerning resistance against corrosion may cause difficulties. Silicic materials such as stone ware, porcelain, glass and synthetic materials, e. g., polymer compounds of vinylchloride, or the like, are chemically resistant but have too low a heat conductivity. As to the materials, only a few are sufficiently corrosion resistant such as "Monel" metal, "zirconium" and "tantalum." However, these metals are so expensive and difficult to secure that the manufacturer of large devices of these metals cannot be supported economically. According to a further development of the invention, a sufficient heat conductivity together with perfect corrosion resistance is obtained by using graphite or graphite containing pressed material for the material of the column.

The graphite column of alternating cross-section size is surrounded by a pipe of corrosion resistant material, e. g. stone ware, porcelain, or particularly advantageously, of iron rubberized on the inside thereof. The inner wall of this pipe is slightly distanced from the column. The inner diameter of the pipe is only slightly greater than the largest outer diameters of the hollow bodies forming the column. The gas to be absorbed must pass alternately through narrow spaces and wide channels, which fact causes a thorough whirling of the gas which in turn benefits the absorption.

STRUCTURAL ARRANGEMENT

Referring now to the drawing in detail, the structure shown in Figure 1, comprises a column according to the present invention which is composed of a vertical pipe 1, having its inner surface covered by a rubber layer 2. In the interior of the relatively narrow pipe 1, there is arranged the column which, along its length, is of alternating cross-section. This column consists of a plurality of bodies 3, which are connected with each other through nipples 4. Each of the bodies is provided with two axial openings for receiving the adjacent nipples 4. Preferably, each hollow body has provided in its upper surface a groove 5. The nipples 4 are preferably provided with thread so that they can be screwed into the hollow bodies. However, if desired, the nipples may be cemented into the hollow bodies or may be provided with slightly conical fitting surfaces so that they can be fitted into the hollow bodies. The nipples 4, have an axial bore therethrough closed at its upper ends, while adjacent this upper end there is provided a plurality of radially extending channels 6 for connecting the axial bore of the nipples with the outside of the nipples.

The cooling means which enters the column at KE at the lower end of the column, passes through the channels 6 into the respective hollow body and leaves the latter through the axial bore of the respective adjacent nipple, in order to enter the next hollow body through the radial channels pertaining to the last mentioned nipple.

The absorption liquid which, in producing hydrochloric acid is water, passes from the upper end to the lower end of the column at the outside thereof as indicated by dashed lines in Figure 1. During its passage from the upper end to the lower end the absorption liquid, after having left the outside of the respective nipple, again collects in the grooves 5, whereas the gas to be absorbed, e. g. hydrogen chloride, passes in countercurrent from the bottom of the column at GE to the top of the column.

While in the drawing only a few hollow bodies 3, have been shown, it is, of course, understood that in the actual build-up of the column a great number of hollow bodies are used. Thus, an absorption device may be built up of three superimposed pipes 1, each having a length of two meters and a diameter of approximately 20 centimeters. Each of these three pipes may comprise about 24 hollow bodies 3 of graphite threadedly connected with each other by nipples 4. The intake of gas and the discharge of the acid may be effected by an iron rubberized lower part not shown in the drawings. At the upper end of the column, a tube having a length of approximately 1 meter is arranged which is provided with a Raschig-ring filling and an intake device for drawing in the gas.

OPERATING EXAMPLES

*Example 1*

An absorption device according to the present invention may be operated as follows:

The absorption device may be charged from the top thereof with 3.6 liters per minute. From the lower end of the device, the device is charged with 2,000 grams per minute of hydrogen chloride gas in the form of a gas mixture produced in the furnace and having approximately 85% HCl; in other words, approximately 1.5 cubic meters per minute are introduced. In these circumstances, at the lower end of the column, approximately 43 liters per minute of hydrochloric acid with an HCl content of 463 grams per liter and a temperature of approximately 38° C. may be withdrawn. About 42 liters per minute having a temperature of 16° C. are introduced into the device from the lower end thereof as cooling means, which cooling means leaves the device at the upper end at a temperature of 37° C.

The waste gases, leaving the device at the upper end, are free from acids.

*Example II*

The absorption device is charged from the top thereof with 4.0 liters per minute of water. 2,140 grams per minute of hydrochloric acid in the form of a gas mixture produced in the furnace containing approximately 75% hydrochloric acid, in other words, approximately 1.75 cubic meters per minute, are introduced into the device from the lower end thereof. In these circumstances approximately 4.75 liters per minute of hydrochloric acid with a HCl content of 450 grams per liter and a temperature of approximately 39° C. may be withdrawn at the lower end of the device. The cooling means is introduced separately into the three parts of the column. It enters at a temperature of 16° C. Sixteen liters per minute pass through the uppermost part of the device and leave the same at a temperature of 62°. Fifteen liters per minute pass through the central part and at an end temperature of 21° C., while eleven liters per minute pass through the lowermost part with an end temperature of 18° C. At the top of the device an acid free mixture of water, gas and air vapor will escape. Thus, the device produces 8.2 tat of concentrated acid.

The device, according to the present invention is also particularly advantageous with regard to the surface area required per tat of HCl acid. A known device requires about 27 sq. meters of surface area for a capacity of 9.4 tat, in other words, approximately 2.5 sq. meters/tat of hydrochloric acid. With the device according to the present invention approximately 6 tat of hydrochloric acid can be produced on a surface area of 2 sq. meters, i. e., approximately 0.33 sq. meters/tat of hydrochloric acid.

A further advantage of the device according to the present invention consists in that the column is made up of a large number of equal hollow bodies which are easily exchangeable. Thus, in case of damage, the hollow bodies can easily and quickly be replaced and repaired without requiring keeping stock of numerous different replacement parts.

It is, of course, understood that the present invention is, by no means, limited to the particular arrangement shown in the drawings, but also comprises any modifications within the scope of the appended claims.

What I claim is:

1. A device for absorbing gases by liquids, which comprises in combination: a plurality of first hollow bodies spaced from and arranged in axial alignment with each other, each of said first hollow bodies having a substantially vertical bore therethrough with a relatively small inlet and outlet section and a relatively wide intermediate section and having its outer top surface provided with a substantially circular groove for accumulating absorbing liquid passing thereover; a plurality of second hollow bodies having an outer diameter materially smaller than the outer diameter of said first hollow bodies and being arranged between and in axial alignment with said first hollow bodies, each of said second hollow bodies having an axial bore open at one end and closed at the other end and also having a plurality of radial bores communicating with said axial bore adjacent said closed end and also communicating with said relatively wide intermediate section of the respective first hollow body; said first and second hollow bodies forming with each other a column with a passage therethrough composed of said vertical bores of said first hollow bodies and said axial and radial bores of said second hollow bodies for passing cooling liquid therethrough, and a pipe surrounding the column formed by said first and second hollow bodies in spaced arrangement thereto so as to form with said column a cylindrical passage of alternately varying relatively wide and narrow annular cross-sections, said pipe having an opening at each end thereof for respectively admitting absorbing liquid and the gas to be absorbed.

2. A device for absorbing gases by liquids according to claim 1, in which the surfaces of said first and second hollow bodies contain graphite.

3. A device for absorbing gases by liquids according to claim 1, in which said first and second hollow bodies consist substantially of graphite.

References Cited in the file of this patent

UNITED STATES PATENTS

| | | |
|---|---|---|
| 729,121 | Boby | May 26, 1903 |
| 762,590 | Lawrence | June 14, 1904 |
| 1,277,124 | Riley | Aug. 27, 1918 |
| 1,922,014 | Brabbee | Aug. 8, 1933 |
| 2,281,594 | Pearl | May 5, 1942 |
| 2,356,530 | Pflock | Aug. 22, 1944 |
| 2,360,714 | Payne | Oct. 17, 1944 |

OTHER REFERENCES

Carbon and Graphite Products, publication of National Carbon Co. of 30 East 42nd Street, New York 17, New York, pages 4 to 6.